United States Patent [19]
Royce

[11] 4,073,495
[45] Feb. 14, 1978

[54] ADVANCEMENT OF STUCK PHONOGRAPH NEEDLES

[76] Inventor: Peter Royce, 205 S. Linden Ave., South San Francisco, Calif. 94080

[21] Appl. No.: 732,039

[22] Filed: Oct. 13, 1976

[51] Int. Cl.² .............................................. G11B 3/00
[52] U.S. Cl. .................................................. 274/1 R
[58] Field of Search .................. 274/1 R, 13 R, 15 R, 274/23 R, 14

[56] References Cited
U.S. PATENT DOCUMENTS 2,079,515  5/1937  Ligh .................................... 274/1 R Primary Examiner—Harry N. Haroian
Attorney, Agent, or Firm—Julian Caplan

[57] ABSTRACT

To advance a "stuck" phonograph needle, a solenoid is mounted in or on the tone arm so that movement of the plunger causes an impact on the arm tending to move the arm upwardly and forwardly (i.e. toward the center of the record). The turntable underside has a magnetic recording track which is tracked by a record and playback head. The record head records vibrations from the record grooves, via the stylus onto the magnetic track, one track at a time. On the next revolution of the turntable the playback head and this information is reversed in phase, and compared with the information currently received from the stylus. If the needle is "stuck", the recorded and current information should null out and this null is detected, causing the solenoid to be energized to create the impact to advance the stylus one groove of the record.

14 Claims, 13 Drawing Figures

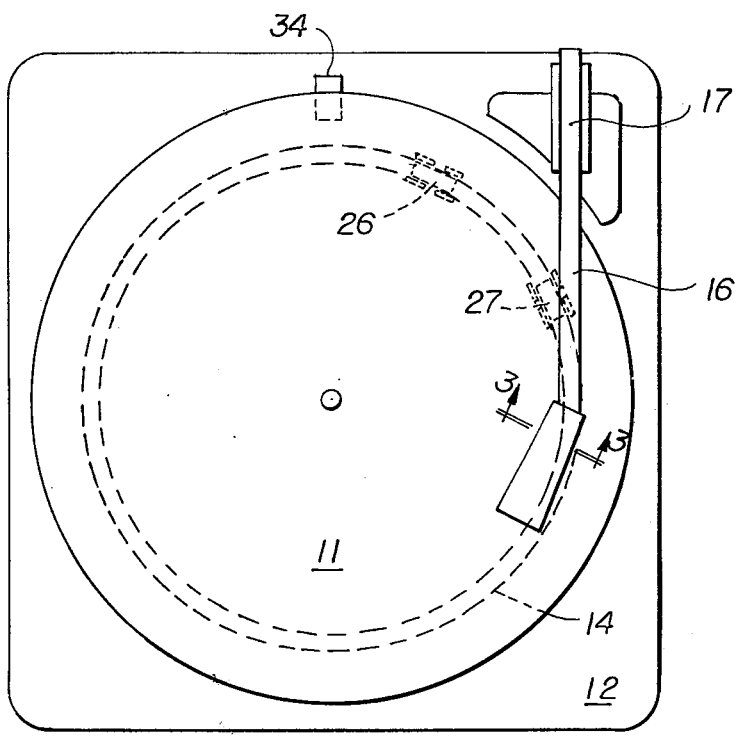
Fig.1
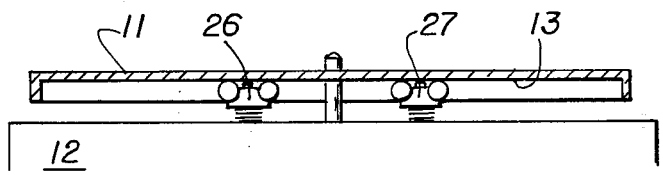
Fig.2
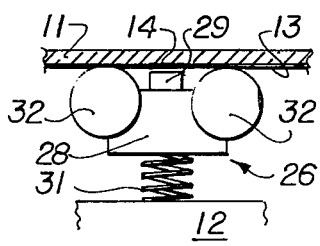
Fig.4
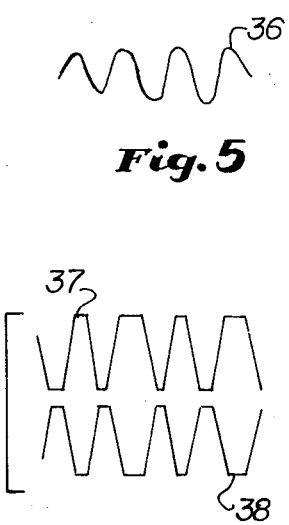
Fig.5
Fig.6
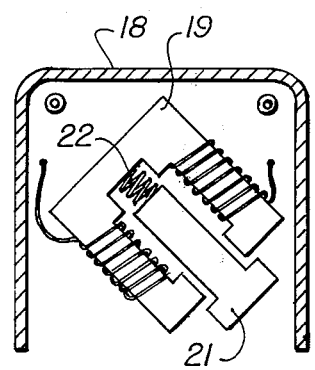
Fig.3

ADVANCEMENT OF STUCK PHONOGRAPH NEEDLES

This invention relates to a new and improved apparatus to advance "stuck" phonograph needles. The common problem of phonograph needles continuing to play the same groove of the track is usually caused by foreign substances, such as dust, on the record surface, or a deep scratch across the surface. The stylus, or needle, jumps from the groove that it is currently tracking back to the groove it has previously tracked. In addition to the great annoyance of this occurrence, permanent damage to the record and unnecessary wear on the stylus may result. Accordingly, it is a principal purpose of the present invention to detect electronically when the stylus is jumping back and automatically to apply an impact force to move the stylus forward to the next groove.

A principal feature of the invention is the provision of means, preferably in the tone arm to deliver an impact to the arm to cause it to jump out of the groove in which it is stuck in a forward-direction. Repetitive impacts are imparted in case the first one is not effective.

The preferred form of the invention involves making a recording of the information which is currently being played by the stylus on a magnetic track, which may be applied to the underside of the turntable. The information currently being emitted is then compared with the information of the preceding track. If the signals of the two are identical, this indicates that the needle is stuck and by electronic means the impact heretofore mentioned is imparted.

The preferred means of detecting when the information imparted from a track is the same as a previous track is to reverse the signal from one of the sources and determine whether a null occurs. However, nulls occur when the stylus is not tracking. Hence an enable circuit is provided to impact the tone arm only when the stylus is accepting information from the record.

A feature of the invention is the fact that there is no contact between the recording head or the playback head and the magnetic track on the reverse of the turntable. Hence wear of the track is reduced. It will be understood that only a very weak signal is required in accordance with the present invention, and hence it is not necessary that the head be in close proximity to the magnetic track. Rollers associated with the heads maintain the heads a fixed distance from the track.

For a system using a stereo head, a switch is provided to switch the recording from one stereo track to the other on successive revolutions. Thus there are two tracks, one revolution removed from each other. The information on the two tracks is compared.

For a system using a monaural head, a switch causes the record/playback head to switch from one mode to the other on each successive revolution. The recorded signal from the prior revolution is played back and compared with the present signal from the stylus.

Other objects of the present invention will become apparent upon reading the following specification and referring to the accompanying drawings in which similar characters of reference represent corresponding parts in each of the several views.

In the drawings:

FIG. 1 is a schematic top plan view of a phonograph turntable and tone arm showing in dot-and-dash lines the magnetic track on the underside of the turntable and two recording heads.

FIG. 2 is a schematic elevational view of a portion of the structure of FIG. 1.

FIG. 3 is a sectional view taken substantially along the line 3—3 of FIG. 1 showing the solenoid which applies an impact to the tone arm.

FIG. 4 is an enlarged fragmentary view showing means for supporting the recording or playback head spaced from the track on the underside of the turntable.

FIG. 5 is a schematic representational view of the signal which is received from a tone arm.

FIG. 6 shows at the upper portion a playback head track after overamplification of the signal. The lower portion shows track two after overamplification and phase inversion.

Figure 7:
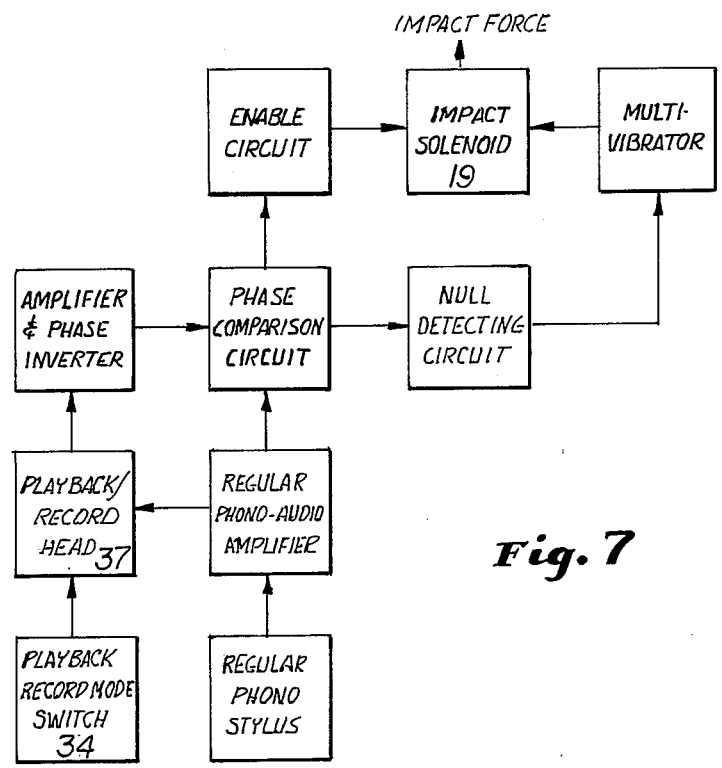
FIGS. 7 and 8 are, respectively, block diagrams of two modifications of the electronic system.

Phonograph structures differ considerably depending upon the manufacturer's preference. The structure shown in FIGS. 1 and 2 is representative. Turntable 11 is rotatably mounted on the record player 12. On the underside 13 of turntable 11 a ferrous oxide record track 14 is applied. Tone arm 16 is mounted on the record player 12 by means of a mounting 17. Within the arm 16 is a housing 18 containing a solenoid 19 which is directed in a direction upwardly and forwardly in the normal direction of movement of the tone arm 16. Solenoid 19 has a plunger 21 in its core. When a pulse is applied to the solenoid, the plunger is caused to move inward, and the plunger impacts sharply at the end of its travel. When the pulse is ended, spring 22 returns the plunger to resting position. Impact of the solenoid tends to move the tone arm 16 upward and forwardly.

Below turntable 11 and in alignment with the track 14 are playback head 26 and recording head 27 which are substantially the same in construction. Mounting 28 for reader 29 is biased toward the track 14 by spring 31 interposed between mounting 28 and the record player base 12. However, the head 29 is spaced from the track 14 by means of rollers 32 mounted on mounting 28 which travel out of contact with the track 14. Hence excessive wear on track 14 is avoided.

Also mounted on base 12 in proximity to the edge of the turntable 11 is a switch 34 which is contacted by a switch contactor on the turntable to switch from one track to the other in a system utilizing stereo recording heads; or switch from record/playback mode in a system utilizing a monaural head.

As shown in FIG. 5, the electrical representation 36 of the signal from the tone arm is a wave. Referring to FIG. 6, by overamplification of the signal 36 wherein the signal is saturated, a sawtooth shape 37 results. Assuming that the signal being received from the stylus at a given instant is the same as what was received in the preceding revolution of the turntable (which is the result if the stylus is stuck), then, by inversion of the signal from the track 14 the track 38 results. If the stylus is stuck, then the two signals 37 and 38 are substantially mirror images. The algebraic sum of the two signals is a straight line or null. Detection of such a null is what causes the solenoid 19 to be energized, as hereinafter explained, and this causes the plunger 21 to impact the tone arm 16 and accordingly, it jumps forward one groove and the needle becomes "unstuck."

Referring now to FIG. 7, the regular phonograph stylus mounted in tone arm 16 generates an electrical signal from the recording disc groove. The regular phonograph audio amplifier of the record player amplifies the signal from the stylus. Switch 34 is a playback-/record mode switch which is controlled by the turntable and switches the mode of operation of the playback-/record head 37. Playback/record head 37 is used alone without the heads 38 in a simplified version of the invention. This head is a standard monaural combination playback and record head equipped with an erase head. The mode of operation (playback or record) is controlled by mode switch 34 which changes every revolution of turntable 11. For example, on one revolution head 37 will be recording information from the regular audio amplifier, and on the next playing back that same information to the phase comparison circuit via the amplifier and phase inverter shown in FIG. 7.

The phase comparison circuit is a diode bridge which adds the two signals, one from the regular phono-audio amplifier and the other from the playback/record head amplifier and phase inverter. If the sum is zero for a predetermined time, the null detecting circuit will generate a trigger voltage. The null detecting circuit is designed to trigger the multi-vibrator when a null is recognized for a predetermined time. It is a transistor gate with an RC timing circuit in the base circuit. The multi-vibrator energizes the impact solenoid 19. The electronic circuit of the multi-vibrator is a basic monostable multi-vibrator which generates a sharp pulse when triggered. The amplitude of the pulse is adjusted so that the impact solenoid 19 will cause sufficient impact force to advance the turntable stylus one recording groove. The impact solenoid is a small electro-magnetic device which, when energized, applies an impact force to the turntable arm 16 and advances the stylus to the next disc groove.

As has been mentioned, nulls occur in a recording at various locations when there is no sound recorded on the disc. Hence an enable circuit is interposed as shown in FIG. 6 so that the solenoid 19 is only enabled when the stylus is accepting information from the phonograph disc. This protects against false detection. This circuit is a transistor gate which is controlled by the signal voltage generated by the stylus and cartridge.

Accordingly, in normal operation, the phase comparison circuit does not detect a null and the null detecting circuit and multi-vibrator are not energized to impact the solenoid 19. However, when the stylus is stuck, and when the enable circuit detects a signal from the stylus, the multi-vibrator causes the impact solenoid to be energized for a sufficient time to deliver the impact force required to advance the arm 16.

Figure 8:
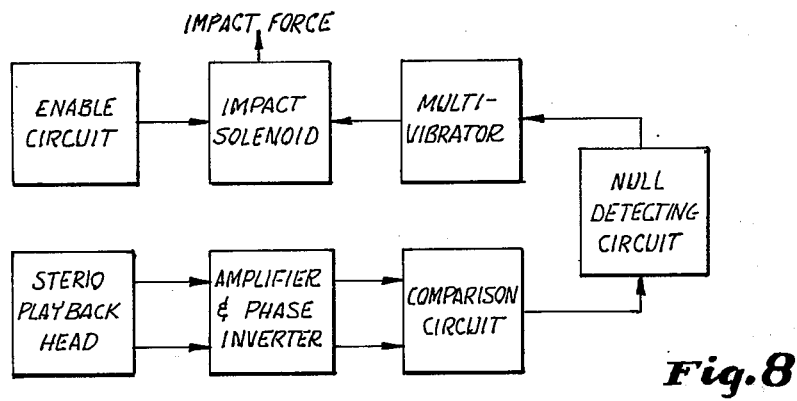
Figure 11:
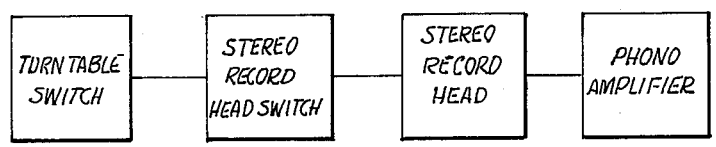
FIG. 11 is a block diagram of a circuit wherein only one track from a stereophonic bread is used, the track used being alternated.

FIG. 8 shows the use of two heads for stereophonic use. In this version of the invention, the stereophonic playback head is continually monitoring the information on the magnetic track 14. The information on each stereophonic track of the record is amplified and reversed in phase with respect to the other. The information on the two channels is added and must be identical if the algebraic sum is zero. The phonograph amplifier is an ordinary amplifier used to amplify the signal from the stylus. This signal is imparted to the stereo recording head 27 which is a typical, inexpensive, low-quality stereophonic recording head and erase head. It records the information from the phonograph amplifier on the magnetic surface 14. FIG. 11 illustrates diagrammatically a stereophonic system. The stereophonic record head switch circuitry is a flip-flop gate which switches the stereophonic head from one track to the other every revolution of the turntable. Each track contains disc information one revolution removed from the other. The turntable switch causes a trigger voltage on each revolution of the turntable. This voltage is applied to a gate which causes the stereo recording head to switch from one track to the other on each successive revolution of the turntable.

Playback head 26 is accepting information from both stereophonic tracks simultaneously and applying them to the amplifiers and phase inverter circuit. Each track contains information one disc revolution removed from the other. The amplifiers and phase inverter amplifies these signals from the stereophonic playback head to saturation and one is reversed in phase with respect to the other. The comparison circuit is a diode bridge which adds the two signals from the amplifiers and phase inverter. If the sum is zero for a predetermined time, the null detecting circuit will generate a trigger voltage as in the previous modification. The enable circuit enables the solenoid only when the stylus is accepting information from the phonograph record.

Figure 9:
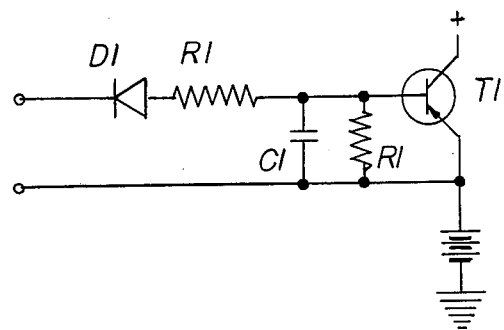
FIG. 9 is a schematic of the enable circuit of either FIGS. 7 or 8.

FIG. 9 shows the enable circuit for either FIG. 7 or 8. The impact solenoid 19 is only enabled when the stylus of the tone arm 16 is accepting information from the phonograph disk. This is to protect against false detection, due to nulls, which may occur when the stylus is not in a disk groove or in a disk groove which does not contain information. The enable circuit is a transistor gate which is controlled by the signal voltage generated by the stylus and cartridge.

Gate transistor T1 is biased so that when no audio signal is present it is near cut off. When an audio signal is detected, the base of T1 becomes more negative causing T1 to saturate, which provides current to the positive bus.

Figure 10:
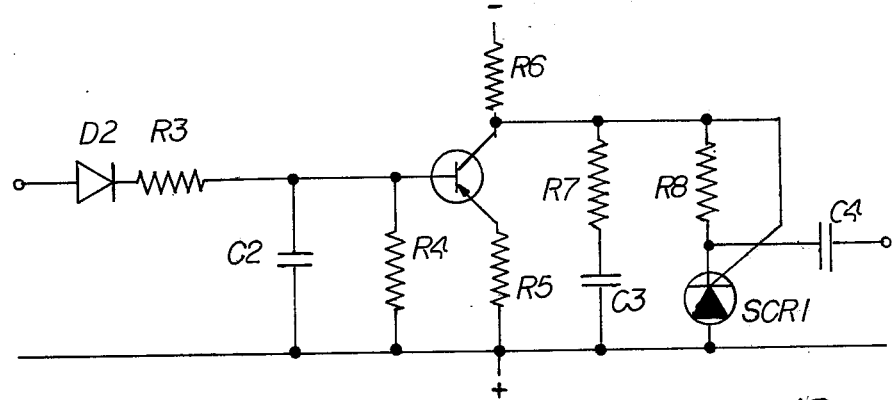
FIG. 10 is a schematic of the null detecting circuit of FIGS. 7 or 8.
Figure 13:
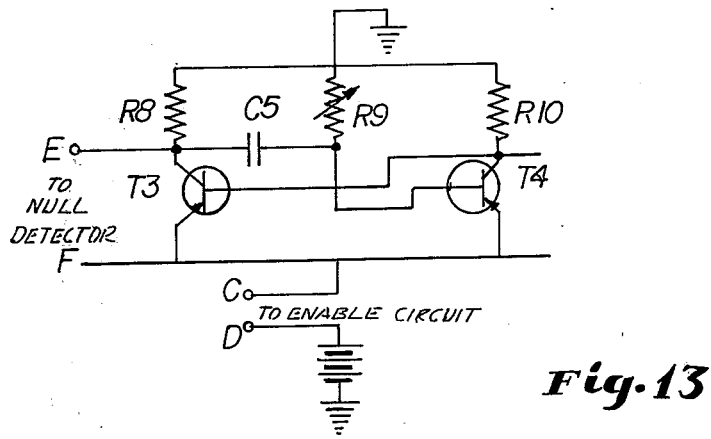
FIG. 13 is a schematic of the multi-vibrator circuit of FIGS. 7 or 8.
Figure 12:
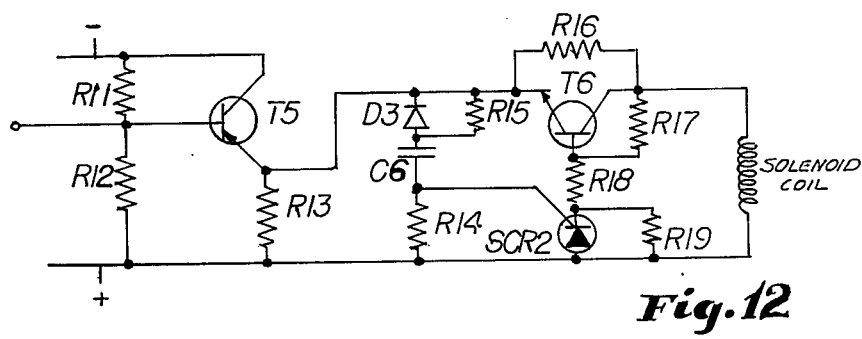
FIG. 12 is a schematic of the impact solenoid circuit of FIGS. 7 or 8.

The null detecting circuit of FIG. 10 for either FIG. 7 or 8 is designed to trigger the multivibrator when a null is present for a predetermined time. It is a transistor gate which controls a thyrister (SCR) and causes a trigger.

When audio is present at the input of the circuit it is rectified by D2 and detected to keep transistor T2 cut off. Capacitor C3 is charged to the supply voltage as long as T2 is cut off. When a null is present, C2 discharges through R4 causing the base of T2 to go negative, and T2 starts to conduct. This will cause the trigger of SCR-1 to go positive with respect to its cathode because the cathode is held at a constant potential by the combination of R8 and C4. SCR-1 will eventually fire, discharging C3 through R7 and R8, creating a sharp voltage spike at C4. When the current through SCR-1 reaches its extinguishing point and the trigger is no longer positive, SCR-1 will cut off. The multivibrator circuit of FIG. 11 for FIG. 7 or 8 is designed to apply a pulse of predetermined length and amplitude to the solenoid impact circuit 19 when a positive pulse is received from the null detector.

In the stable state, transistor T3 is cut off and transistor T4 is saturated. When a positive pulse is received at the input E it starts transistor T4 to cut off. This causes the collector of T4 and the base of T3 to go negative, causing transistor T3 to go to saturation and T4 to cut off. The abrupt change of potential on the collector of T3 charges capacitor C5. C5 will discharge through R9 and R8 to a point where T4 will start to again conduct. This causes T3 to cut off and T4 once more to saturate where the circuit is again stable.

The impact solenoid circuit 19 is designed to receive the square pulse from the multivibrator and process it so that a second impulse received within a predetermined time will be stronger than the first. The reason for this is that if two or more record grooves are damaged, which causes the stylus to retrack, a more powerful solenoid impact will cause the stylus to cross the damaged area.

T5 is biased to cut off. When a negative pulse from the multivibrator arrives at the base of T5, it causes a voltage to be impressed across R13. This charges C6 through D3 and R14 and, because T6 is biased to cut off, causes a current in R16 and the solenoid coil. As C6 charges, the voltage across R14 becomes less negative with respect to the positive bus. Finally, it will reach a point where the trigger of SCR-2 is positive with respect to its cathode, causing SCR-2 to fire. This will open the T6 gate and hold it open after the multivibrator pulse until C6 discharges through R15 and various other paths. The time constant is chosen to keep the T6 gate open for a record revolution (about two seconds). If another pulse is generated by the multivibrator in this time period, the current through the solenoid will be stronger causing an increased impact.

What is claimed is:

1. A device for advancing a "stuck" stylus having a current output for use in a record player having a turntable on which a record having multiple grooves is rotated and a tone arm having a stylus to engage said record, comprising impact means mounted on or in said tone arm of a phonograph operable to deliver an impact to said tone arm to drive said stylus upwardly and inwardly relative to said record to advance said stylus at least one record groove and actuating means for actuating said impact means, said actuating means comprising recording means for temporarily making a temporary record of the output of said stylus for one rotation of said turntable, comparison means for detecting when the current output of said stylus is substantially identical with said temporary record and thereby to detect when said stylus is stuck in a groove, and means responsive to said comparison means for activating said impact means.

2. A device according to claim 1 in which said impact means comprises a solenoid having a reciprocating plunger, said plunger having a line of movement disposed upward and inward relative to said turntable, said actuating means energizing said solenoid to advance said plunger on said line of movement.

3. A device according to claim 2 in which said recording means comprises a magnetic recording track and a recording — playback — erasing head in proximity to said track and means for advancing said track and said head relative to each other in a continuous path, said head erasing said track and recording on said track the current output of said stylus, said head also playing back the recording on said track.

4. A device according to claim 3 in which said track is affixed to the underside of said turntable.

5. A device according to claim 4 which further comprises mounting means for said head, resilient means biasing said head toward said turntable, and means to hold said head a fixed distance from said track.

6. A device according to claim 3 in which said comparison means comprises electronic means for reversing in phase the output of said playback head and adding said reversed output to the current output of said stylus and null detecting means for detecting when the sum of said adding is substantially zero.

7. A device according to claim 6 which further comprises an enable circuit between said actuating means and said impact means, said enable circuit having an input derived from the current output of said playback head and operable to enable said impact means only when said stylus is actually accepting information from said record.

8. A device according to claim 3 which further comprises a mode switch and means on said turntable for actuating said switch to reverse said head from recording to playback on alternate rotations of said turntable.

9. A device according to claim 6 which further comprises a multivibrator to energize said solenoid, said multivibrator generating a sharp pulse when triggered by a predetermined voltage, said null detecting means triggering said multivibrator when a null is detected for a predetermined time.

10. A method for advancing a "stuck" stylus having a current output for use in a record player having a turntable on which a record having multiple grooves is rotated and a tone arm having a stylus to engage a groove of said record said method comprising the step of electrically comparing the current output of said stylus with the current output of said stylus one revolution of said turntable previous to determine if said outputs are substantially identical and upon said detection of substantial identity the step of generating an electrical signal and the step of actuating by said signal means to deliver an impact to said tone arm in a direction to advance said stylus to the next groove of said record.

11. A method according to claim 10 which further comprises the step of enabling said step of actuating only when said stylus is currently accepting information from said record.

12. A method according to claim 10 in which said step of comparing comprises recording magnetically the output of said stylus for one revolution of said turntable, reversing the phase of the current output of said stylus, and detecting any null in the sum of said two outputs.

13. A method according to claim 12 in which said step of recording magnetically comprises recording on a magnetic track on the underside of said turntable.

14. A method according to claim 13 which further comprises reversing from recording on said track to playback on alternate rotations of said turntable.

* * * * *